(12) United States Patent
Okano et al.

(10) Patent No.: US 10,386,700 B2
(45) Date of Patent: Aug. 20, 2019

(54) ILLUMINATION APPARATUS

(71) Applicant: CANON KABUSHIKI KAISHA, Tokyo (JP)

(72) Inventors: Yoshinobu Okano, Shiraoka (JP); Toshiki Miyakawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 15/421,803

(22) Filed: Feb. 1, 2017

(65) Prior Publication Data

US 2017/0219196 A1 Aug. 3, 2017

(30) Foreign Application Priority Data

Feb. 2, 2016 (JP) ................. 2016-017667

(51) Int. Cl.
*G03B 15/02* (2006.01)
*G03B 15/05* (2006.01)

(52) U.S. Cl.
CPC ...... *G03B 15/05* (2013.01); *G03B 2215/0514* (2013.01)

(58) Field of Classification Search
CPC ........ G03B 15/02; G03B 15/03; G03B 15/05; G03B 15/041; G03B 15/0442; G03B 15/0447; G03B 2215/0514; F21V 29/503; F21V 29/70
USPC .......................................................... 362/6
See application file for complete search history.

(56) References Cited

U.S. PATENT DOCUMENTS

| | | | | | |
|---|---|---|---|---|---|
| 5,040,007 | A | * | 8/1991 | Hagiuda ................ | G03B 15/05 396/155 |
| 6,240,255 | B1 | * | 5/2001 | Yamaguchi ............ | G03B 15/05 362/3 |
| 6,466,744 | B1 | * | 10/2002 | Hosaka .................. | G03B 15/05 396/155 |
| 2004/0146292 | A1 | * | 7/2004 | Kawakami ............. | G03B 15/05 396/200 |

FOREIGN PATENT DOCUMENTS

JP   2015-152642 A   8/2015

* cited by examiner

Primary Examiner — Matthew J. Peerce
(74) Attorney, Agent, or Firm — Cowan, Liebowitz & Latman, P.C.

(57) ABSTRACT

The illumination apparatus includes a housing holding an optical member, a light emitter housed in the housing and including a light source configured to emit illumination light projected frontward through the optical member, an emission control substrate disposed behind the light emitter and on which electronic components for controlling emission of the light source are mounted, and a heat radiating member configured to cause heat transmitted from the light source to an outer face of the light emitter to radiate. The heat radiating member includes a lower face portion, a side face portion and a rear face portion disposed so as to respectively face a lower face and a side face of the light emitter and the emission control substrate.

7 Claims, 7 Drawing Sheets

ILLUMINATION APPARATUS

BACKGROUND OF THE INVENTION

Field of the Invention

The present invention relates to an illumination apparatus used with an image capturing apparatus such as a digital camera.

Description of the Related Art

The above-mentioned illumination apparatus (flash apparatus) requires preventing components in the apparatus and an optical member such as a Fresnel lens panel disposed at a light-exiting portion from being melted by heat generated by emission of a light source such as a xenon tube. Therefore, various methods for making the heat generated by the emission of the light source hard to transmit to the optical member have been proposed.

Japanese Patent Laid-Open No. 2015-152642 discloses a configuration in which a reflector disposed behind a light source and a reflector holder holding the reflector are covered by a heat radiating plate and the heat radiating plate is connected to a frame of a flush unit. This configuration enables heat of the reflector and reflector holder to transmit through the heat radiating plate to the frame.

However, in the configuration disclosed in Japanese Patent Laid-Open No. 2015-152642, the reflector and the reflector holder are connected to the frame via the heat radiating plate, which makes it impossible to move the light source, the reflector and the reflector holder with respect to the frame. Accordingly, this configuration cannot be applied to a flush unit including an illumination light zoom function that changes a distance from the light source and the reflector to a Fresnel lens panel fixed to the frame to change an illumination angle of an illumination light.

SUMMARY OF THE INVENTION

The present invention provides an illumination apparatus being capable of efficiently radiating heat generated by emission of a light source via a heat radiating member and having a heat radiating structure applicable to an illumination light zoom function.

The present invention provides as an aspect thereof an illumination apparatus including a housing holding an optical member, a light emitter housed in the housing and including a light source configured to emit illumination light projected frontward through the optical member, an emission control substrate disposed behind the light emitter and on which electronic components for controlling emission of the light source are mounted, and a heat radiating member configured to cause heat transmitted from the light source to an outer face of the light emitter to radiate. The heat radiating member includes a lower face portion, a side face portion and a rear face portion disposed so as to respectively face a lower face and a side face of the light emitter and the emission control substrate.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 9:
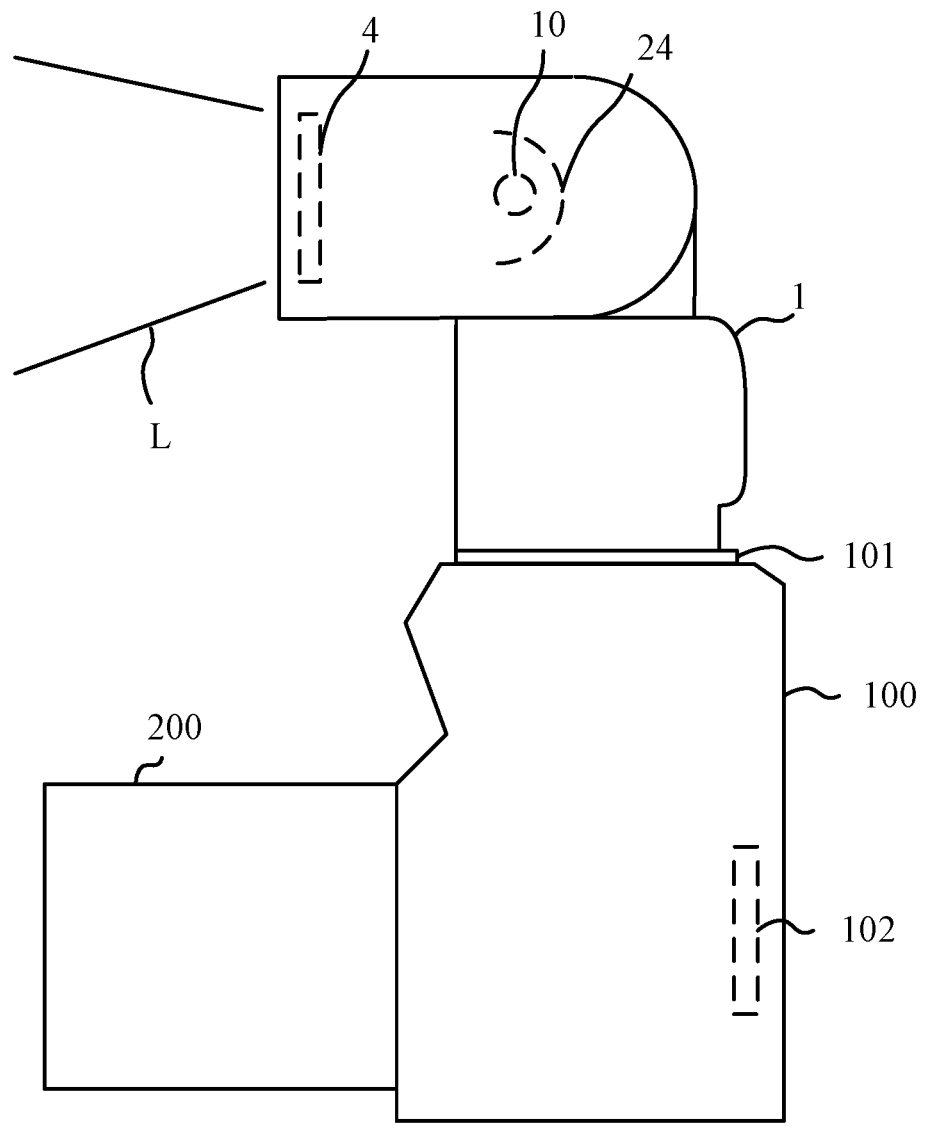
FIG. 9 illustrates an image capturing system including the flash apparatus of the embodiment.

FIG. 9 illustrates an image capturing system including a flash apparatus 1 as an illumination apparatus that is an embodiment of the present invention and a digital camera 100 as an image capturing apparatus to which the flash apparatus 1 is detachably attached. The flash apparatus 1 is attached to an accessory shoe 101 provided at a top portion of the digital camera 100 and projects illumination light L onto an object (not illustrated) through a light-exiting surface (an optical panel 4 described later).

Figure 1A:
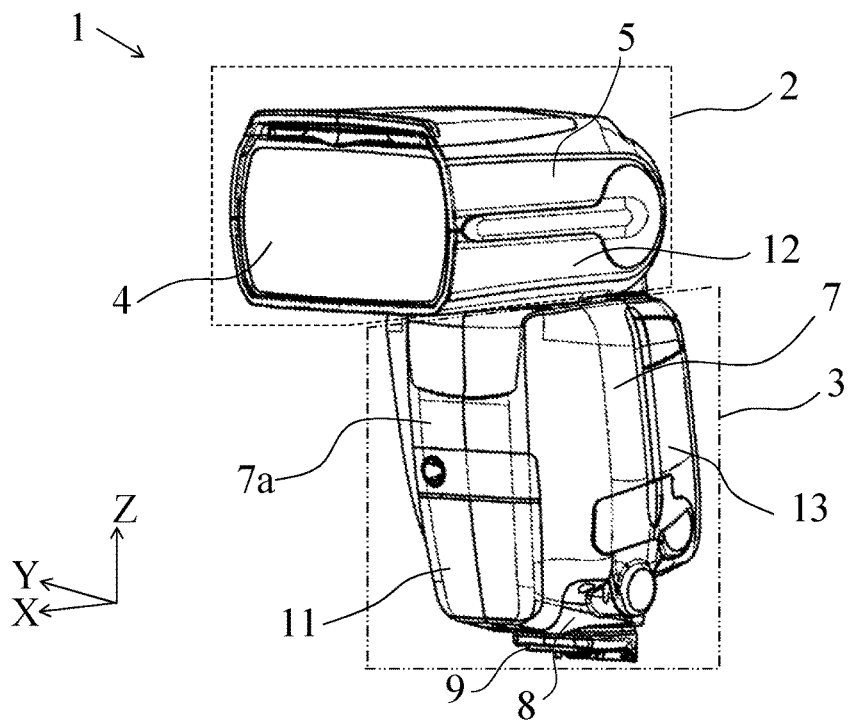
FIGS. 1A and 1B are external perspective views of a flash apparatus that is an embodiment of the present invention.
Figure 1B:
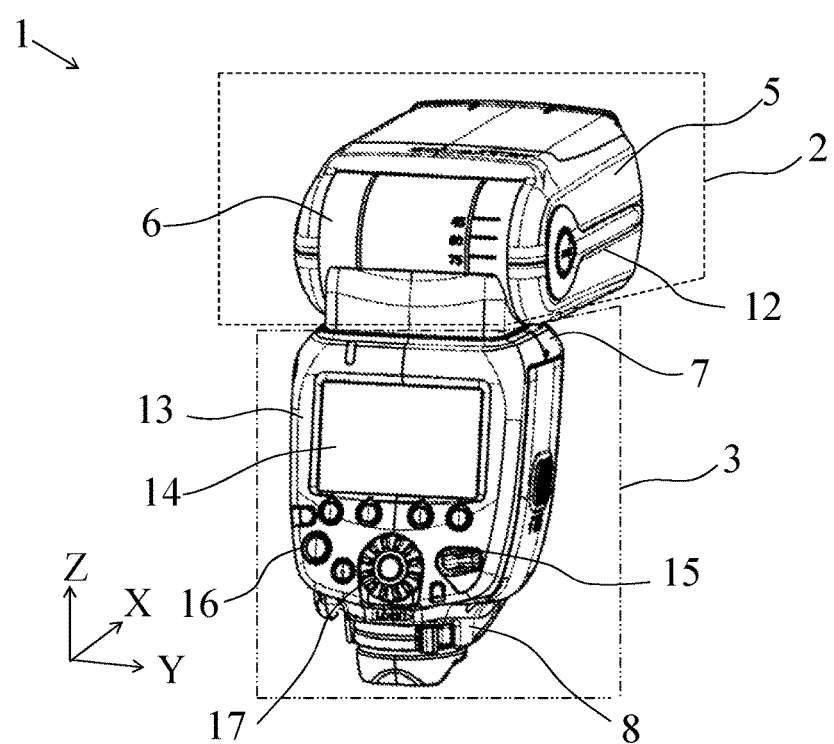

An interchangeable lens 200 that causes light from an object to form an object image is detachably attached to the digital camera 100. The digital camera 100 includes an image sensor 102 configured to capture (photoelectrically convert) the object image. FIGS. 1A and 1B illustrate exteriors of the flash apparatus 1. FIG. 1A illustrates the flash apparatus 1 viewed from an optical panel side where the optical panel 4 is disposed, and FIG. 1B illustrates the flash apparatus 1 viewed from a side opposite to the optical panel side. In the following description, a side toward which the illumination light is projected through the optical panel 4 is referred to as "a front side", and a side opposite thereto is referred to as "a rear side".

The flash apparatus 1 is constituted by a head portion 2 and a control portion 3. At a normal position of the camera 100 illustrated in FIG. 9, the head portion 2 is located at a top end of the control portion 3. The head portion 2 is provided at its front end with the optical panel (optical member) 4 such as a Fresnel lens panel and houses thereinside a xenon tube 10 as a light source. The head portion 2 has a bounce function that changes a projection direction of the illumination light projected through the optical panel by rotating the head portion 2 in a vertical direction (Z direction) and a horizontal direction (XY-in-plane direction).

Furthermore, the head portion 2 includes, as housings, a head upper cover 5, a head lower cover 12 and a bounce case 6 having a cylindrical shape. The head upper and lower covers 5 and 12 are rotatable in the vertical direction with respect to the bounce case 6. The bounce case 6 is rotatable in the horizontal direction with respect to the control portion 3.

The head upper and lower covers 5 and 12 hold at their front end portions the optical panel 4. In the following description, a face of the head portion 2 located at a lower side in a state where the optical panel 4 faces forward when the camera 100 is at the normal position illustrated in FIG. 9 is referred to as "a lower face", and a face thereof opposite to the lower face is referred to as "an upper face".

The control portion 3 supports the head portion 2 and controls operations of the head portion 2. The control portion 3 is constituted by a rear cover 13, a front cover 7 and a bottom cover 8 each being an exterior member. On the rear cover 13, a display panel 14, a power switch 15, operation buttons 16 and a dial 17 are provided. The operation buttons 16 and dial 17 are operated by a user for setting various functions.

At a central portion of the front cover 7 that is a front side exterior member of the control portion 3, a bulge portion 7a protruding frontward is formed. In the bulge portion 7a, a window 11 for enabling external light control, light pulse communication and assist light projection is formed. The assist light is used for assisting focus detection performed by the camera 10 when the focus detection is performed on a low luminance object.

The bottom cover 8 is disposed at a lower side of the control portion 3. The bottom cover 8 is provided with a foot portion 9 that connects to the accessory shoe 101 of the camera 100 illustrated in FIG. 9.

Figure 2:
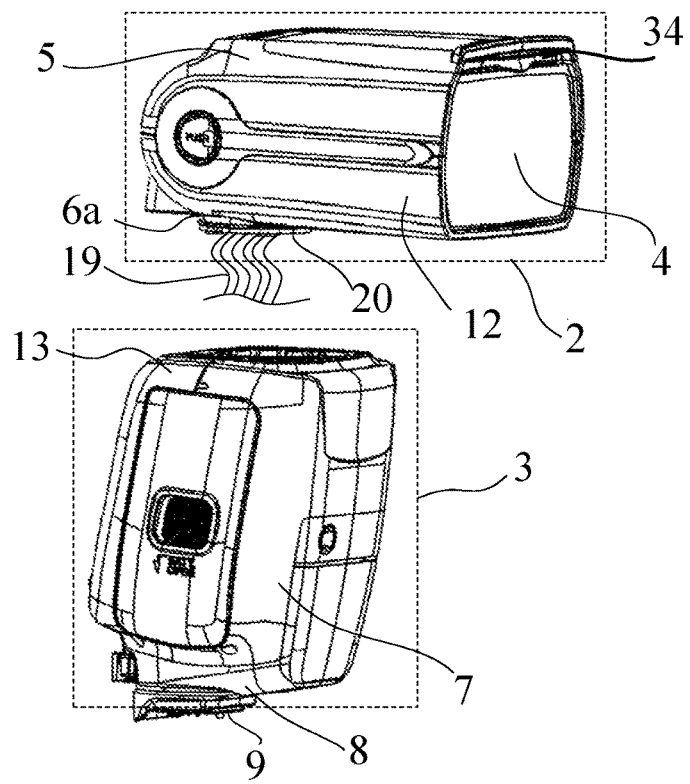
FIG. 2 is an exploded perspective view of the flash apparatus of the embodiment.

Next, with referring to FIGS. 2 and 3, description will be made of an internal configuration of the bounce case 6. FIG. 2 illustrates the head portion 2 separated from the control portion 3, and FIG. 3 illustrates the head portion 2 cut along an X direction in FIGS. 1A and 1B.

Figure 3:
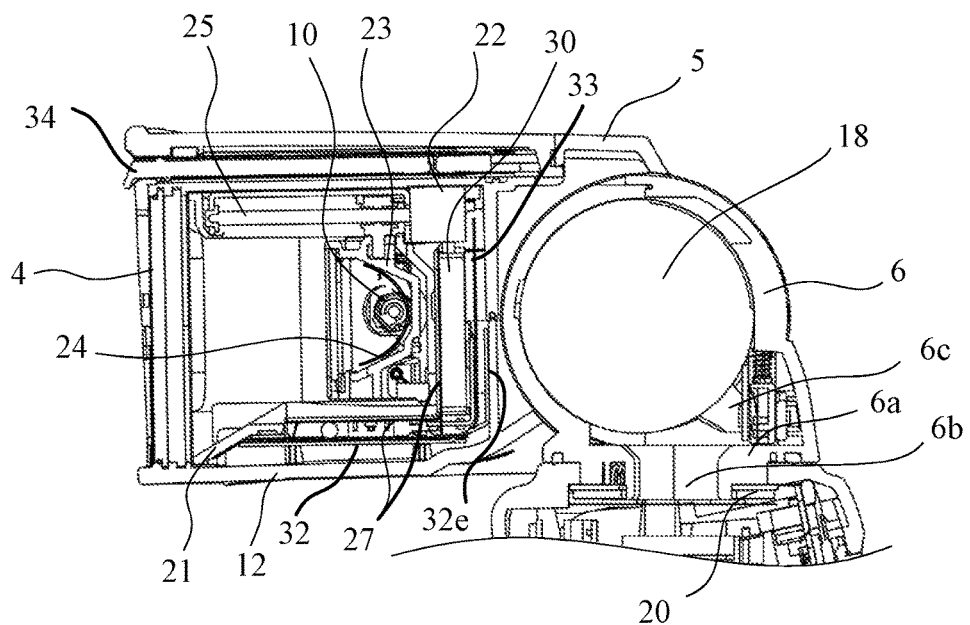
FIG. 3 is a sectional view of a head portion of the flash apparatus of the embodiment.

As illustrated in FIG. 3, in a capacitor housing portion 6c inside the bounce case 6, a main capacitor 18 is disposed (housed). The main capacitor accumulates charge used for emission of the xenon tube 10. The charge accumulated in the main capacitor 18 generates a high voltage necessary for the emission of the xenon tube 10. The main capacitor 18 is disposed on a rotation axis when the head portion 2 is rotated in the vertical direction with respect to the control portion 3. The main capacitor 18 is disposed near a coupling portion at which the head portion 2 and the control portion 3 are coupled to each other.

Wiring (not illustrated) connected to a flexible wiring board 27 passes through a rotation portion (not illustrated) between the bounce case 6 and the head upper cover 5 rotatable about a cylinder's center of the bounce case 6 to extend to the capacitor housing portion 6c. This wiring is connected to the main capacitor 18 and constitutes part of a wire harness 19 illustrated in FIG. 2. The wire harness 19 is drawn out from the head portion 2 through a hole 6b formed at a center of an axis portion 6a of the bounce case 6. The wire harness 19 electrically connects, through a connector provided at its leading end, electronic components such as the xenon tube 10 and the main capacitor 18 provided in the head portion 2 with a control substrate provided in the control portion 3.

To a lower end of the axis portion 6a of the bounce case 6, a rotation plate 20 constituting the coupling portion of the head and control portions 2 and is provided. The rotation plate 20 has a role of restricting a horizontal rotatable angle range of the head portion 2 within a predetermined range. In addition, the rotation plate 20 has a role of preventing the head portion 2 from separating from the control portion 3.

Figure 4:
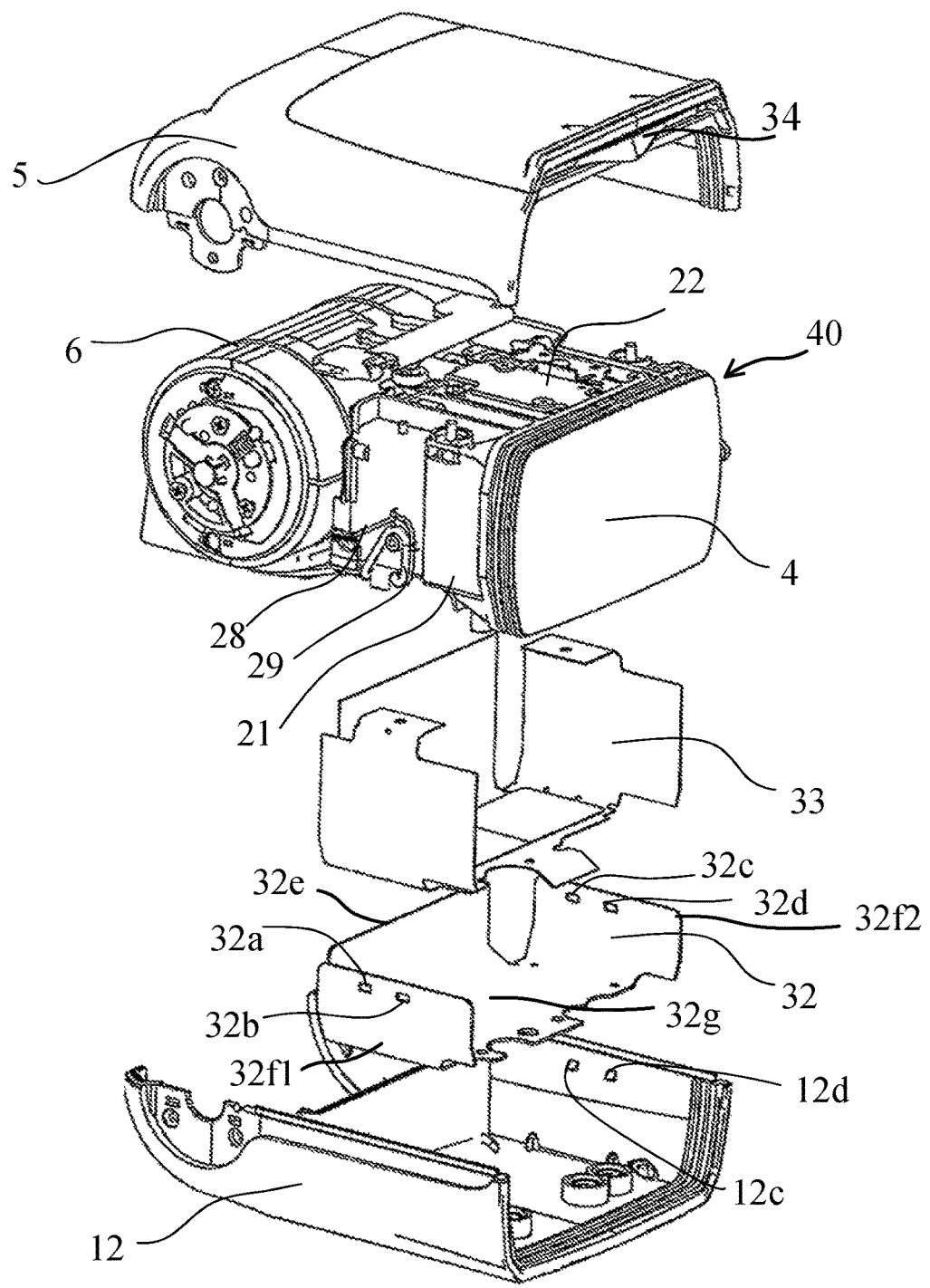
FIG. 4 is an exploded perspective view of the head portion illustrated in FIG. 3.
Figure 5:
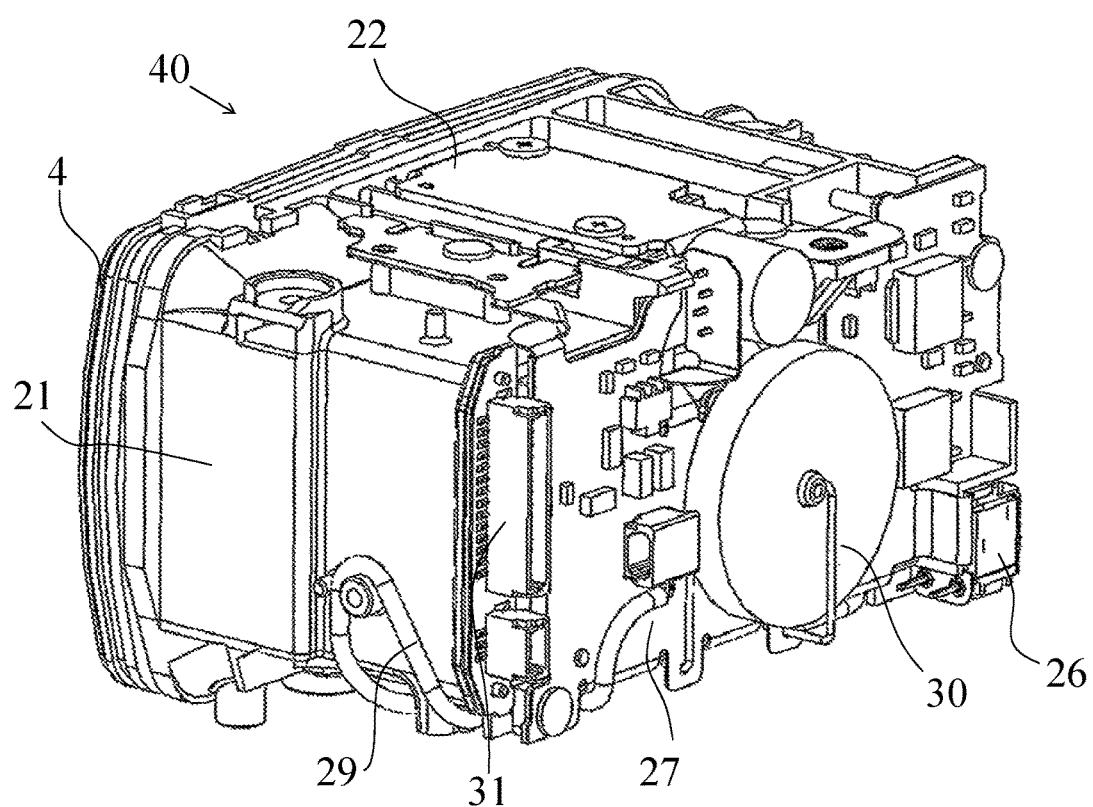
FIG. 5 is a perspective view of a light emitter unit of the flash apparatus of the embodiment.

Next, with referring to FIGS. 3, 4 and 5, description will be made of an internal configuration of the head portion 2. FIG. 4 illustrates an inside of the head portion 2 from which the head upper cover 5 and the head lower cover 12 are removed and a heat radiating plate 32 and an insulating sheet 33 described later are also removed and which is viewed from its top side. FIG. 5 illustrates a light emitter unit 40 housed in the above-described housing.

The flash apparatus 1 of this embodiment has an electrically driven illumination light zoom function that changes an illumination angle (that is, a projection angle range) of the illumination light by changing a relative distance between the optical panel and the xenon tube 10. The inside of the head portion 2 is almost occupied by the light emitter unit constituting a mechanism relating to the illumination light zoom function.

At an upper portion of a hood 21 that is a structural member of the light emitter unit 40 and is a light-shielding member to prevent light from the xenon tube 10 from leaking out, a motor unit 22 as an actuator including a lead screw 25. That is, the motor unit 22 for moving the xenon tube 10 is provided in an upper area above the xenon tube 10 in the light emitter unit 40.

A reflector holder 23 housed inside the hood holds the xenon tube 10 and a reflector 24 each being fixed thereto. The reflector 24 reflects the light from the xenon tube 10 frontward. Specifically, the reflector 24 covers rear, upper and lower sides of the xenon tube 10 to reflect lights emitted rearward, upward and downward from the xenon tube 10 toward the optical panel 4. The reflector holder 23 is movable forward and rearward in the light emitter unit 40 by receiving a driving force from the rotating lead screw 25 of the motor unit 22 so as to change a distance of the xenon tube 10 and the reflector 24 from the optical panel 4. This movement changes the illumination angle of the illumination light. Although this embodiment describes the flash apparatus 1 having the configuration that changes the distance of the xenon tube 10 and the reflector 24 from the optical panel 4 to change the illumination angle of the illumination light, another configuration may be employed that changes a distance between upper and lower portions of the reflector 24 to change the illumination angle of the illumination light.

The xenon tube 10 starts discharge in response to application of a trigger voltage from a trigger coil 26 to emit light. The trigger coil 26 is mounted on the flexible wiring board 27 disposed at a rear face of the hood 21 and is electrically connected to the reflector 24 via a trigger cable 28. The trigger voltage is applied to the xenon tube 10 from the trigger coil 26 via the reflector 24.

At the rear face of the hood 21, the flexible wiring board 27 is fixed as described above. The flexible wiring board 27 constitutes an emission control substrate connected to the xenon tube 10. On the flexible wiring board 27, electronic components relating to emission control, such as the above-described trigger coil 26 and a later-described choke coil 30, that constitute an emission control circuit are mounted. Furthermore, on the flexible wiring board 27, a connector 31 for connecting the wire harness 19 to the wiring board 27.

The choke coil 30 is electrically connected to the main capacitor 18 and the xenon tube 10 therebetween to restrict an electric current supplied from the main capacitor 18 to the xenon tube 10 to enable a flat emission control and to reduce an electrical load of the xenon tube 10.

The flexible wiring board 27 also extends from the rear face of the hood 21 to a lower face thereof.

On the flexible wiring board 27 fixed to the lower face of the hood 21, a bounce adapter mount detector and a color filter mount detector (each not illustrated) are mounted. The bounce adapter mount detector and the color filter mount detector respectively detect that a bounce adaptor and a color filter (each not illustrated) that are accessories for the flash apparatus 1 are mounted to the head portion 2 so as to cover the optical panel 4.

On both outer side faces of the hood 21, xenon tube cables 29 connected to the xenon tube 10 are disposed. Moreover, on one of the side faces of the hood 21, a trigger cable 28 connecting the trigger coil with the reflector 24 is disposed. When the relative distance between the optical panel 4 and the xenon tube 10 (and the reflector 24) is changed for changing the illumination angle of the illumination light as described above, the xenon tube cables 29 and the trigger cable 28 are moved so as to follow the reflector holder 23.

At an outside of the upper face of the hood 21, a wide panel 34 as an auxiliary optical member for changing the illumination angle of the illumination light is disposed. The wide panel 34 is held so as to be movable between a retracted position illustrated in FIG. 3 and a use position facing a front face of the optical panel 4. Alternatively, a catch light sheet may be disposed as another auxiliary optical member instead of the wide panel 34. The catch light sheet reflects, when the illumination direction is upward, the illumination light to provide a catch light effect to an object. The catch light sheet may be disposed together with the wide panel 34.

Figure 6A:
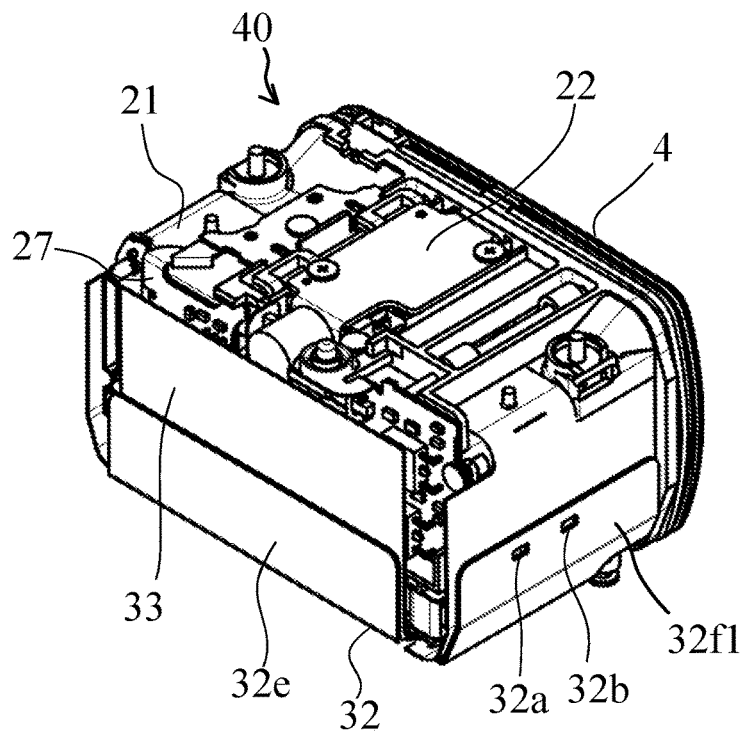
FIGS. 6A and 6B are perspective views of the light emitter unit of the embodiment.
Figure 6B:
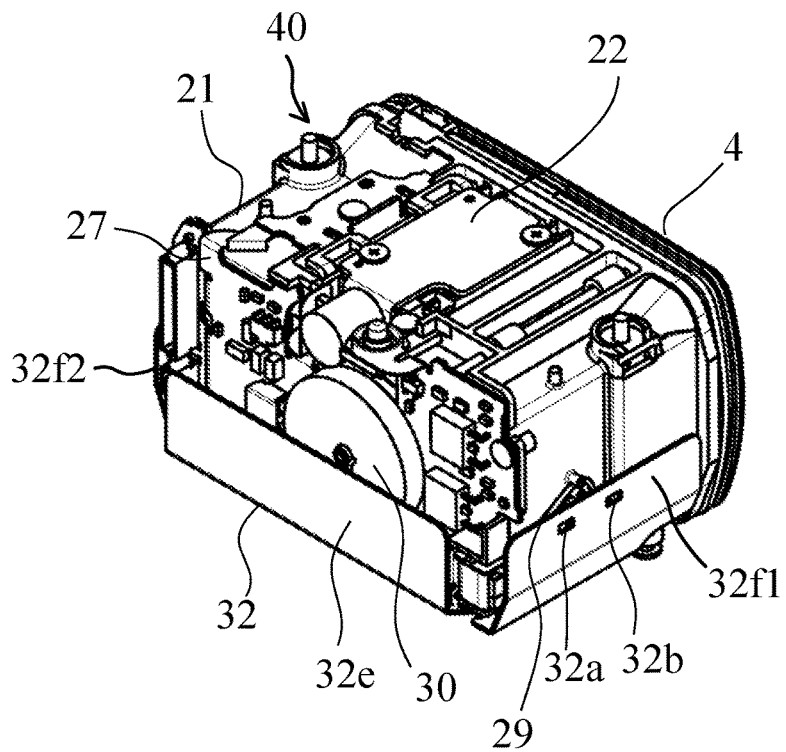
Figure 7:
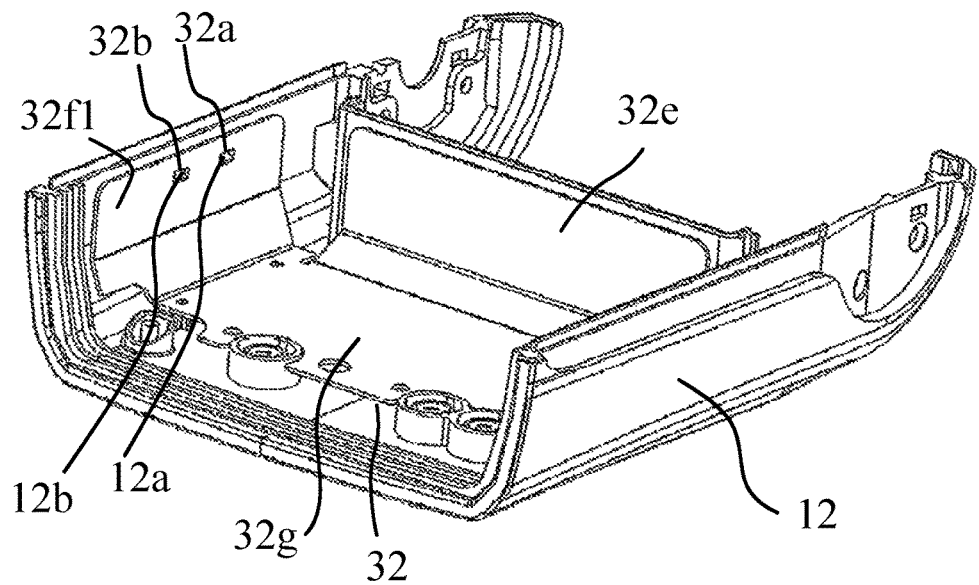
FIG. 7 is a perspective view of a head lower cover and a heat radiating plate in the flash apparatus of the embodiment.

Next, with referring to FIGS. 6A, 6B and 7, description will be made of a heat radiating structure of the head portion 2 in this embodiment. FIG. 6A illustrates the heat radiating structure in which a heat radiating plate 32 as a heat radiating member and an insulating sheet 33 as an electrical insulating member are provided to the light emitter unit 40. FIG. 6B illustrates the heat radiating structure in which the insulating sheet 33 is removed from that illustrated in FIG. 6A. FIG. 7 illustrates part of the heat radiating structure in which the heat radiating plate 32 is fixed to the head lower cover 12.

In order to cause heat generated by emission of the xenon tube 10 to radiate, the heat radiating plate 32 is disposed so as to face the lower face and side faces of the hood 21 and a rear face of the flexible wiring board (emission control substrate) 27. The heat radiating plate 32 has a lower face portion 32g, side face portions 32f1 and 32f2 and rear face portion 32e respectively facing the lower face and the side faces of the hood 21 and the rear face of the flexible wiring board 27 with air layer therebetween. The heat radiating plate 32 is a single-piece member formed of a highly heat-conductive metal such as aluminum. Hole portions 32a, 32b, 32c and 32d formed in the side face portions 32f1 and 32f2 of the heat radiating plate 32 engage with claws 12a, 12b, 12c and 12d formed in the head lower cover 12, and thereby the heat radiating plate 32 is fixed to the head lower cover 12.

In this embodiment, the heat generated by the Xenon tube 10 and transmitted to the hood 21, that is, to an outer face of the light emitter unit 40 is transmitted via the air layers to the heat radiating plate 32. The transmitted heat is radiated by the heat radiating plate 32 to be transmitted to the head lower cover 12 and then is radiated from the head lower cover 12. This heat radiating structure prevents a hot spot from being formed inside the head portion 2, which enables increasing a maximum number of times of emission and shortening a minimum emission interval that are predetermined in order to prevent the head portion 2 from being overheated in consecutive emissions.

Furthermore, in this embodiment, the heat radiating plate 32 provided so as to face the lower face, side faces and rear face of the light emitter unit 40 positively causes the heat from the xenon tube 10 to radiate. However, the heat radiating plate 32 is provided so as not to face the upper face of the light emitter unit 40. This is because on the upper face of the light emitter unit 40 a lot of members capable of radiating heat, such as the wide panel 34 and walls of a housing portion in which the wide panel 34 is housed, are present as compared with the lower face, side faces and rear face of the light emitter unit 40. In addition, the heat radiating plate 32 provided so as not to face the upper face of the light emitter unit 40 enables reducing a thickness of the head portion 2 in the vertical direction. When the thickness of the head portion 2 in the vertical direction is not considered, the heat radiating plate 32 may be provided so as to face the upper face of the light emitter unit 40.

The rear face portion 32e of the heat radiating member 32 facing the rear face of the hood 21 is disposed between the flexible wiring board 27 and a rear face portion of the head lower cover 12. As described above, the choke coil 30 is mounted on the flexible wiring board 27. Applying an electric current to the chock coil 30 generates a magnetic field from the chock coil 30. Increasing the size (area) of the rear face portion 32e of the heat radiating plate 32 such that the rear face portion 32e covers the entire flexible wiring board 27 is effective for increasing heat radiation efficiency. However, covering the entire chock coil 30 by the heat radiating plate 32 changes the magnetic field and thereby generates electromagnetic induction. Thereby, the magnetic field from the chock coil 30 and a magnetic field from the heat radiating plate 32 repel each other, which causes vibrations of the chock coil 30 and heat radiating plate 32. Furthermore, the vibration may cause noise.

Therefore, in this embodiment, as illustrated in FIG. 6B, the rear face portion 32e of the heat radiating plate 32 is formed so as to have a shape covering only a part (lower half portion) of the chock coil 30, which prevents the generation of the electromagnetic induction.

Figure 8:
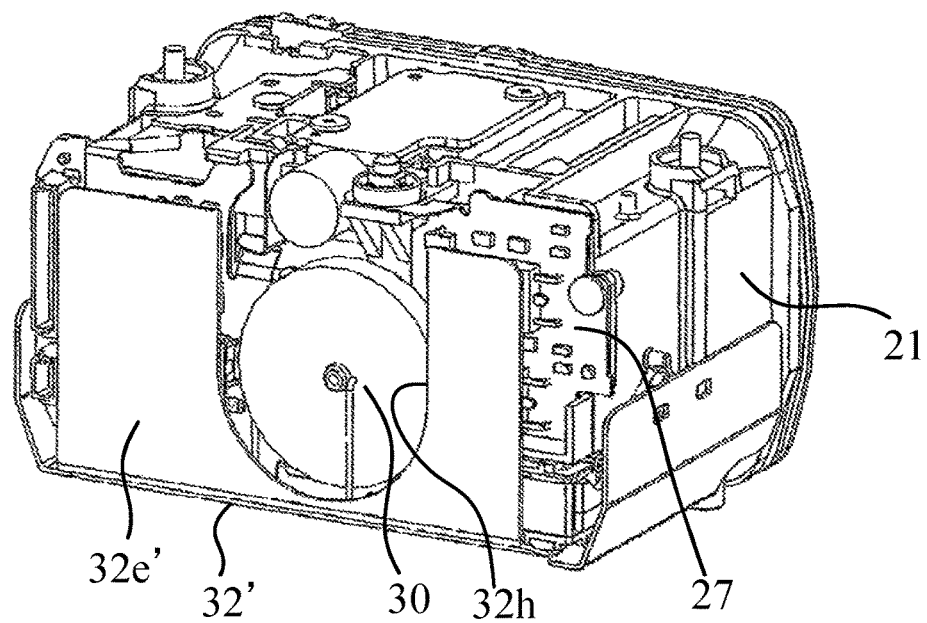
FIG. 8 is a perspective view of a heat radiating plate as a modified example of the embodiment.

As a modified example, a configuration may be employed that, as illustrated in FIG. 8, a rear face portion 32e' of a heat radiating plate 32' extends up to an approximately equal height to an upper end of the choke coil 30 and an opening 32h is formed at a part of the rear face portion 32e' facing the choke coil 30.

This configuration that the heat radiating plate 32' has a shape not covering the choke coil 30 also prevents the generation of the electromagnetic induction.

Moreover, in this embodiment, the rear face portion 32e of the heat radiating plate 32 is disposed along the rear face portion of the head lower cover 12 located between the light emitter unit 40 and the bounce case 6 housing the main capacitor 18. This configuration makes it possible to easily transmit the heat from the light emitter unit 40 to the main capacitor 18. The main capacitor 18 provides low performance at low temperatures, so that the heat transmitted from the light emitter unit 40 to the main capacitor 18 can increase the performance of the main capacitor 18 in a low temperature environment. In addition, the main capacitor 18 has a lot of metal portions and thereby has a high heat conductivity, so that the heat transmitted from the xenon tube 10 is easily radiated.

Next, description will be made of the insulating sheet 33. The insulating sheet 33 is disposed between the hood 21 and the heat radiating plate 32 and has a lower face portion and a rear face portion. The insulating sheet 33 prevents an electrical short circuit caused by contact between the flexible wiring board 27 and the heat radiating plate 32. Furthermore, in order to prevent the trigger cable 28 and the xenon tube cables 29 from being damaged by scraping against the heat radiating plate 32, the insulating sheet 33 further has side face portions disposed so as to cover the side faces of the hood 21.

As described above, this embodiment as the flash apparatus 1 having the illumination light zoom function enables reducing an excessive increase in temperature in the head portion 2 caused by the emission of the xenon tube 10 and enables increasing a number of allowable emission times.

In other words, this embodiment enables the heat generated by the emission of the light source in the light emitter to be efficiently radiated via the heat radiating member and achieves a heat radiating structure applicable to the flash unit in which the light source is movable in the light emitter for the illumination light zoom function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-017667, filed on Feb. 2, 2016, which is hereby incorporated by reference herein in its entirety.

What is claimed is:

1. An illumination apparatus comprising:
a housing holding n optical member;
a light emitter housed in the housing and including a light source configured to emit illumination light projected frontward through the optical member;
an emission control substrate disposed behind the light emitter and on which a choke coil for controlling emission of the light source is mounted; and
a heat radiating member configured to be formed of a metal and to be housed in the housing and to cause heat transmitted from the light source to an outer face of the light emitter to radiate,
wherein the heat radiating member includes a lower face portion, a side face portion and a rear face portion disposed so as to respectively face a lower face and a side face of the light emitter and the emission control substrate,
wherein the rear face portion of the heat radiating member has a shape not covering at least part of the choke coil, and
wherein the light source is movable in the light emitter such that a distance from the optical member to the light source is changed.

2. An illumination apparatus according to claim 1, wherein an actuator for moving the light source is provided in n upper area above the light source in the light emitter.

3. An illumination apparatus according to claim 1, further comprising:
an auxiliary optical member disposed above the light emitter,
wherein the heat radiating member is disposed so as not to face an upper face of the light emitter.

4. An illumination apparatus according to claim 3, wherein the auxiliary optical member is a wide panel for changing an illumination angle of the illumination light.

5. An illumination apparatus according to claim 1, wherein the heat radiating member is disposed between the light emitter and a capacitor accumulating charge used for the emission of the light source.

6. An illumination apparatus according to claim 1, wherein an electrical insulating member is disposed between the ear face portion of the heat radiating member and the emission control substrate.

7. An illumination apparatus according to claim 1, wherein the apparatus is detachably attachable to an image capturing apparatus configured to perform image capturing of an object.

* * * * *